United States Patent

[11] 3,621,382

[72] Inventor Jean-Yves Valet
    5 Rue General Mignot, 38 Seyssinet, France
[21] Appl. No. 864,307
[22] Filed Oct. 7, 1969
[45] Patented Nov. 16, 1971
[73] Assignee Commissariat A L'Energie Atomique
    Paris, France
[32] Priority Oct. 10, 1968
[33] France
[31] 169,489

[54] ANISTROPIC THIN FERROMAGNETIC FILM MAGNETOMETER
    13 Claims, 6 Drawing Figs.

[52] U.S. Cl. .................................................. 324/43
[51] Int. Cl. .................................................. G01r 33/02
[50] Field of Search .................................... 324/43, 47

[56] References Cited
    UNITED STATES PATENTS
    3,271,665  9/1966  Castro et al. ............... 324/43
    3,400,328  9/1968  Penn et al. .................. 324/43

FOREIGN PATENTS
    995,307  6/1965  Great Britain ............... 324/43

OTHER REFERENCES
    Geyger; W.; Flux Gate Magnetometer Uses Toroidal Core; Electronics, June 1, 1962 pp. 48–52.

Primary Examiner—Rudolph V. Rolinec
Assistant Examiner—R. J. Corcoran
Attorney—Cameron, Kerkam & Sutton ABSTRACT: A thin bistable ferromagnetic film of the inverted type (i.e. for which the coercive forces $H_c$ and $H_{ct}$ are smaller than the anisotropy field $H_k$) is used as sensor and is associated with a pumping coil which submits the film to an alternating field (frequency $f$) along the easy axis and with a detection coil wound around the easy axis. A steady biasing field is applied along the hard axis, at least if the thin film is a flat strip. The value of the field component along the easy axis is deduced from the time difference between successive reversals of the magnetic vector in the strip from the amplitude of the harmonic $2f$ of the signal in the detection coil.

The magnetometer makes it possible to detect fields as low as 0.1 $\gamma$ since reversal of the magnetic vector in the film is made without wall movement and consequently without Barkhausen noises.

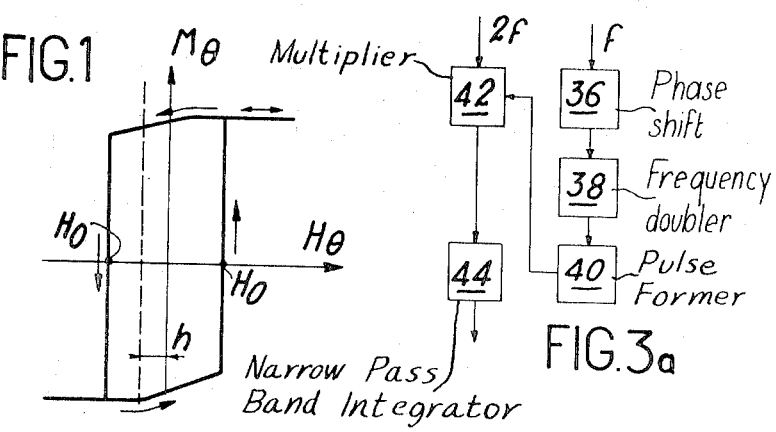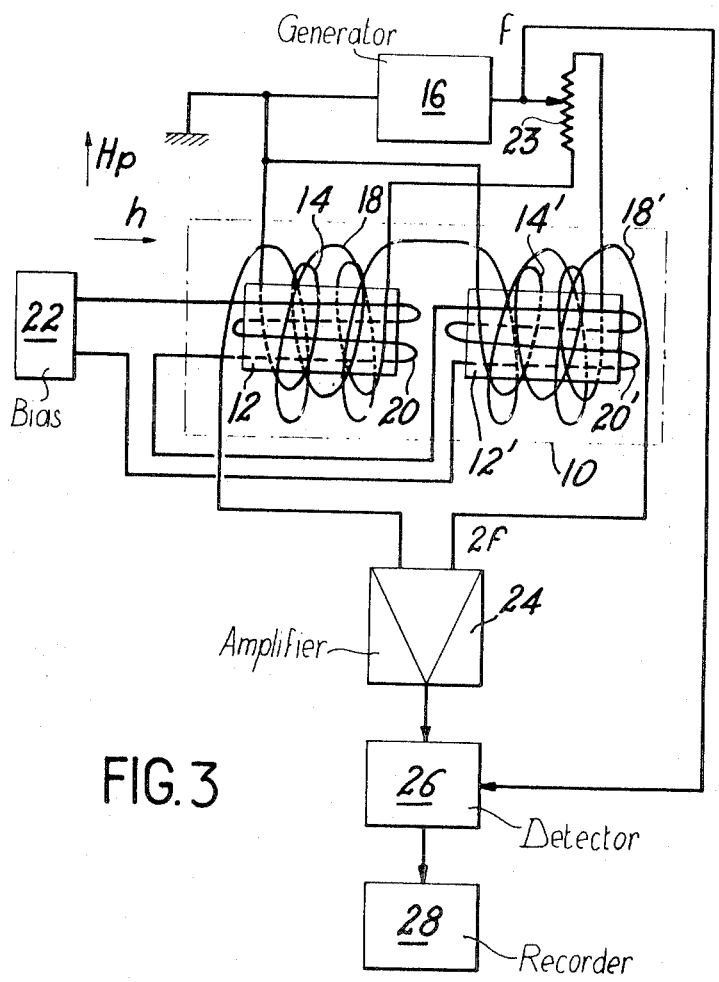

ANISTROPIC THIN FERROMAGNETIC FILM MAGNETOMETER

The present invention relates to a device for measuring weak magnetic fields.

It has already been proposed to measure a magnetic field with a probe comprising a core of ferromagnetic material which has a square hysteresis loop and a coil for subjecting the core to an alternating magnetic field having an amplitude such that it brings the core to saturation; it is possible to deduce the value of the magnetic field to be measured from the amplitude of the even harmonics of the signal which is collected (usually at a frequency which is double the frequency of the excitation current) in a second coil which is also operatively associated with the core.

The devices which use this approach have operated satisfactory but they do not meet the conditions for the accurate measurement of magnetic fields of very low value. This is due in particular to the presence of high and inevitable background noises which mask the useful signal if the latter is weak.

There has also been proposed a device for measuring magnetic fields which employs as sensor a thin ferromagnetic film having an axis of easy magnetization (which will also be designed hereinafter by the term "easy axis" for the sake of greater simplicity). The words "thin film" are used to designate a film having a thickness small enough for preventing appearance of a domain wall parallel to the surfaces of the film. The maximum thickness of such films is generally in the 5,000 A. range. There are associated with this thin strip a pumping winding which produces an alternating field oriented along the easy axis and adapted to switch the magnetic vector in the film about the easy axis, a detection winding having an axis at right angles to the axis of easy magnetization and a compensating winding having the same axis as the preceding and adapted to produce a field in opposition to the component of the field to be measured which is directed at right angles to the easy axis. This device produces in the detection winding an output signal which depends on the component at right angles to the easy axis of the field which is applied to the thin film (difference between the external field and the field produced by the compensating winding).

This device makes use of the reversal of the magnetic vector of the thin film at each alternation of the field produced by the pumping winding: this changeover can be carried out only by displacement of the walls in the thin film and is thereby associated with high Barkhausen noises which limit the sensitivity; in practice, this device cannot be employed for measuring fields lower than approximately 10 gamma (1 gamma=$10^{15}$ oersted). Moreover, these noises limit the accuracy of the measurement.

An object of the present invention is to provide a device of improved sensitivity and accuracy; this result is attained by utilizing a phenomenon which exhibits only a very low background noise and consists in the reversal of the direction of induction in a ferromagnetic thin film by coherent rotation. Compared with the other possible mechanism of wall motion in magnetic thin films, this reversal mechanism has the advantage of absence of Barkhausen noises.

According to the invention, there is provided a device for measuring the magnitude of the component of an external magnetic field along a direction, comprising a thin ferromagnetic film of the reversed type having an easy axis of magnetization along said direction and a hard axis of magnetization and having a square hysteresis loop, means for subjecting said film to an alternating magnetic field parallel to the easy axis and of sufficient amplitude to reverse the magnetic vector in said thin film, a detection coil along said easy axis and means for analyzing the electric signals collected by said detection coil.

Analysis of the signal may consist in comparing the time intervals which elapse between the successive reversals of induction in the film the difference between two successive time intervals being representative of the component of the field along the easy axis.

Since the direct measurement of the time intervals is difficult, it will usually be preferable to measure the amplitude of an even harmonic (preferably the second harmonic) of an electric signal collected in a coil which is associated with the thin film and sensitive to variations of induction in the film: in order to eliminate the fundamental signal, there can advantageously be employed in that case a symmetrical arrangement including twin thin films. Preferably, there is also applied to the said film a polarizing field which is directed at right angles to the axis of easy magnetization, at least when the film is a flat strip.

The term "film" must obviously be understood to mean both the materials which are presented in the form of coatings on wires and those which have the usual form of flat strips. The first presentation even has the advantage of permitting the formation of thin films having an extremely small size.

In the foregoing definition as well as in the following description, the term "film of the reversed type" designates a thin film in which the critical curve of total coherent rotation is located wholly within the critical curve of wall motion, contrary to the thin films commonly employed. Moreover, the term "pumping" field designates a symmetrical and cyclic alternating field which is usually sinusoidal.

In accordance with a first embodiment of the invention, the polarizing or bias field which is directed along the hard axis of magnetization of the film (which is perpendicular to the easy axis) is a steady field and has an intensity of the same order as the amplitude of the pumping field.

In accordance with another embodiment of the invention, the polarizing field which is directed along the hard axis of magnetization of the film (at right angles to the easy axis) is an alternating field and is constituted by the component along the hard axis of an alternating field whose component along the easy axis constitutes the pumping field.

The essential improvement brought by the invention lies in the fact that the reversal of the magnetic vector in the ferromagnetic thin film occurs by coherent rotation since the walls are blocked and do not cause noise: it is thus possible to measure low fields with a sufficient degree of accuracy and to detect fields as low as 0.1 gamma.

The invention will be better understood from the following description of embodiments of the invention. The description refers to the accompanying drawings, wherein:

FIG. 1 shows very diagrammatically the variations of the component $M_\theta$ of the magnetic vector of the film, this component being parallel to the direction of application of an external field $H_\theta$ which makes an angle $\theta$ with the easy axis of magnetization of a reversed thin film which is also subjected to a magnetic field $h$ directed along the easy axis;

FIG. 2 shows diagrammatically the critical curve of total coherent rotation, the critical curve of partial coherent rotation and the critical curve of wall motion of a thin film which can be employed for inducing signals resulting from the reversal of magnetization by application of the alternating field along the easy axis, for different values of a steady bias field which is applied along the hard axis, FIG. 3 is a simplified block diagram of the electrical circuit which is associated with a thin film for constituting a magnetometer;

FIG. 3a is a block diagram of the detector of FIG. 3;

Figure 5:
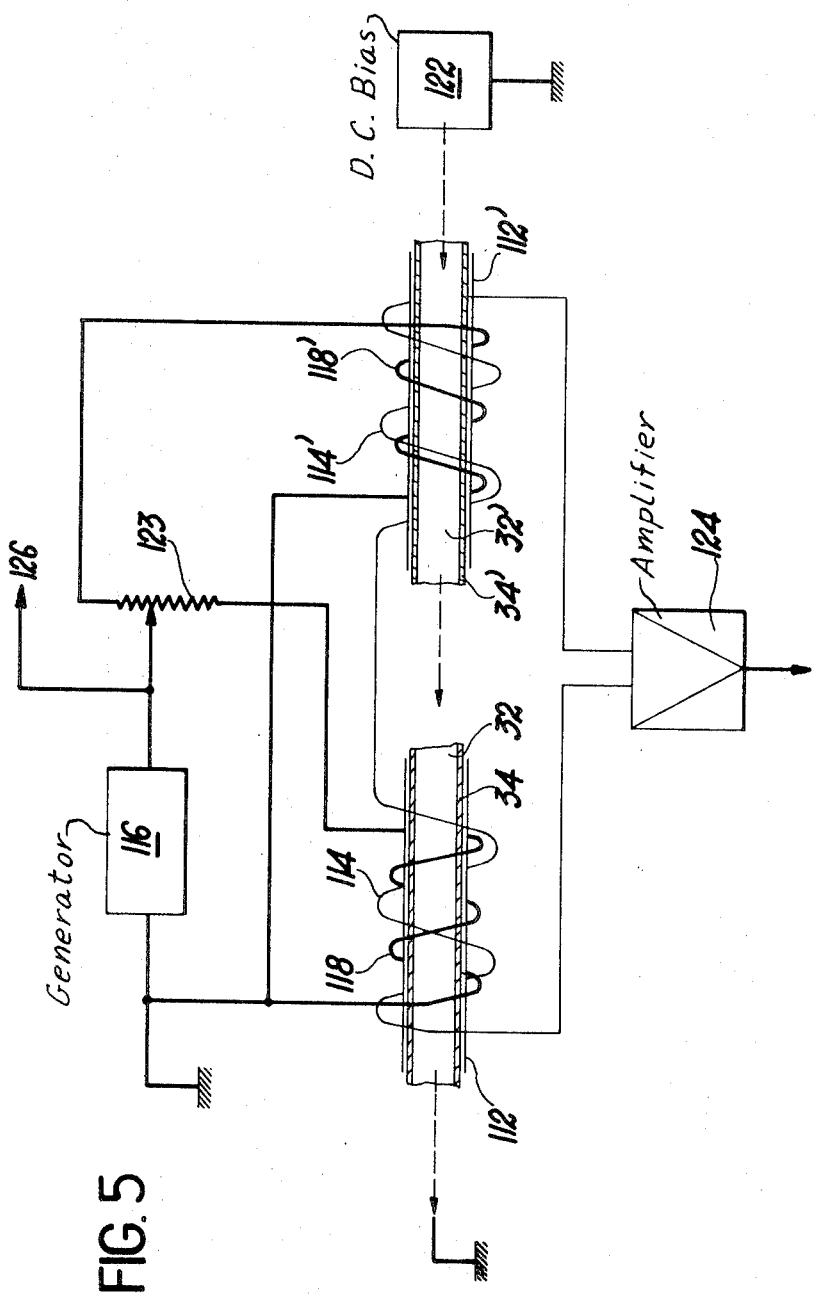

FIG. 5, which is similar to FIG. 3, shows the circuit which is associated with a wire for constituting a magnetometer.

It may be useful to recall a few properties of anisotropic thin films. These films are formed of ferromagnetic material and have a preferential direction or so-called easy axis along which the magnetic vector in the film tends to be oriented. On the contrary, the magnetization never tends to move into the perpendicular direction or so-called hard axis. Once the magnetic vector of the thin strip is directed along the easy axis, its orientation has a high degree of stability and for reversing the magnetic vector, it is necessary to apply a field having a component in the opposite direction and a value higher than a predetermined minimum.

FIG. 1 shows the hysteresis loop of such a ferromagnetic thin film when subjected to an alternating magnetic field $H_\theta$ having a constant direction making an angle $\theta$ of about 45° with the easy axis of the thin film. The loop is of square shape and there is a saturation field $H_\theta$ beyond which there exists a single position of equilibrium for the magnetization or magnetic vector $M_\theta$. In a more general manner, it is known that there exists in respect of a given film a so-called "critical curve" which assumes the shape of an astroid and gives the intensity of the applied magnetic field in the case of the different orientations with respect to the easy axis beyond which there exists only one possible stable state for the magnetization: for further information on this subject, reference can be made to various documents such as, for example, the communication entitled "Ferromagnetic alloys in memory systems" by G. Grunberg (International symposium on memory-system techniques, Paris 1965, page 85).

The hysteresis loop which is given in FIG. 1 is plotted as a function of the total field $H_\theta$ applied to the thin strip: if this field is constituted by the sum of a constant field $h$ to be measured and of an alternating field, there appears a relative displacement with respect to the origin: if the alternating field is symmetrical and has a constant frequency, the existence of the additional field $h$ will result in different time intervals between the successive instants of reversal. It is therefore possible to measure the applied field by comparing these time intervals either directly (by detection of the instants of reversal) or indirectly, as will become apparent hereinafter, by measurement of the amplitude of an even harmonic of the resultant signal, preferably of the second harmonic.

Before proceeding with a detailed description of a particular device for measuring magnetic fields in accordance with an embodiment of the invention, it should also be recalled that the reversal of magnetization in a ferromagnetic thin film having uniaxial magnetic anisotropy can be carried out by means of a number of mechanisms. If it is assumed that the thin film is a single domain, theory indicates that the reversal takes place as a result of total coherent rotation of the magnetization as soon as the applied field vector passes beyond the critical curve (curve I in FIG. 2). This curve is essentially characterized by the value of the field $H_k$ or so-called anisotropy field at which the curve intersects the easy axis of magnetization.

In fact, experiments relating to the reversal of magnetization in the currently available ferromagnetic thin films show that the reversal does not take place as indicated by the theory of coherent rotation: although this explanation is only a hypothesis, it can be assumed that this divergence between theory and experience is due to the existence of several domains having opposite magnetization and therefore to the existence of separation walls between the domains whereas theory presupposes a single-domain state of magnetization.

Be that as it may, the reversal of magnetization in the usual films takes place mostly by displacement of walls and results in an increase in size of those domains whose magnetization initially has an orientation close to that of the final state and a decrease of the other domains. This may be illustrated by a second critical curve or so-called wall-motion curve: reversal of the magnetic vector takes place when the applied-field vector passes beyond this curve which can be characterized by the value $H_c$ of the field which is directed along the easy axis for which reversal of magnetization takes place as a result of wall motion.

In the thin films about 2,000 A. thick the slope of the hysteresis loop along the hard axis is quite different from that of FIG. 1.

For lower and lower thicknesses however, the loop along the hard axis progressively changes and is similar to that along the easy axis for a thickness lower than 500 A.: the minimum value of the field which abruptly switches the induction or magnetic vector in the film along the easy axis may then be considered as another characteristic value of the film. This value $H_{ct}$ is designated transverse coercive field.

In the currently available ferromagnetic films, the field $H_c$ (and $H_{ct}$ if applicable) is smaller than the field $H_k$ and the utilization of reversal of magnetization in a film of this type for the purpose of measuring a magnetic field encounters the problem of Barkhausen noises which accompany the displacements of walls.

Figure 2:
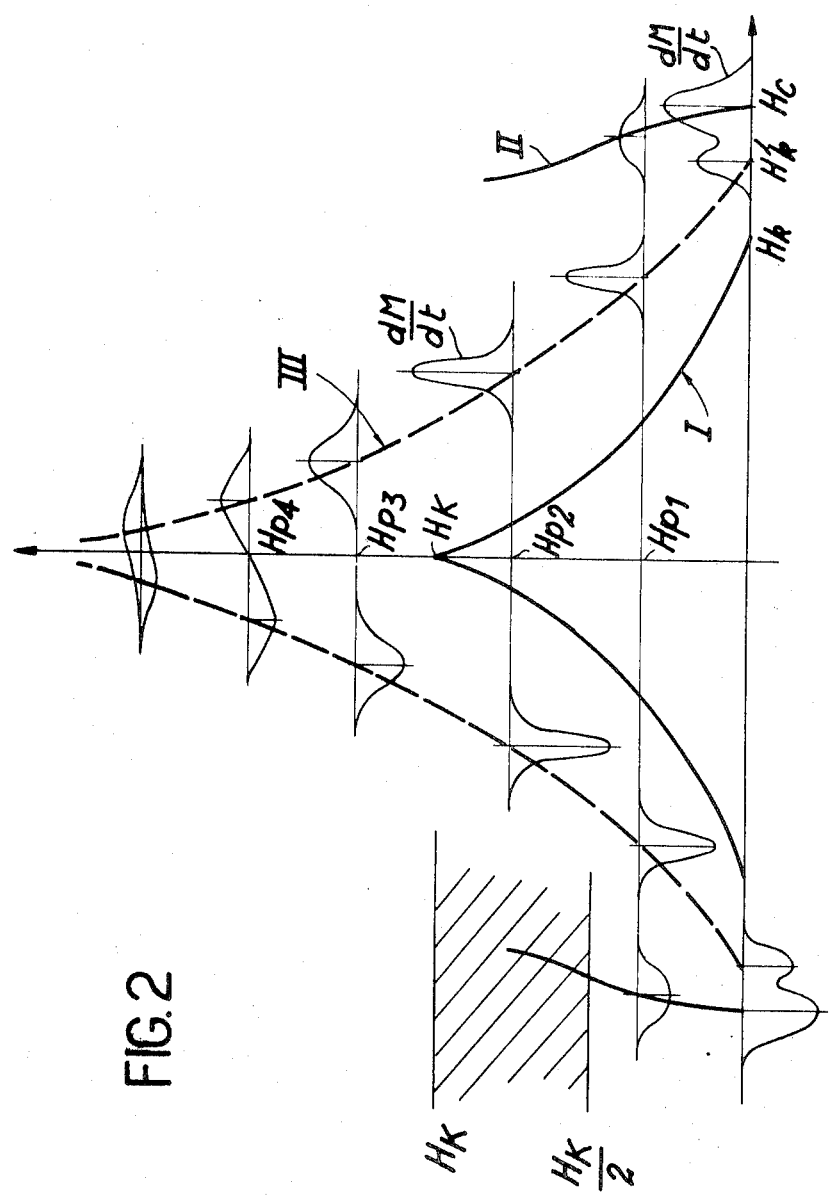

The invention proposes on the contrary to have recourse for the measurement of a field to reversal of magnetization by coherent rotation, which evidently makes it necessary to satisfy the condition $H_c > H_k$. In other words, the relative arrangement of the curve II (critical curve of wall motion) and of the curve I (curve of total coherent rotation) must be as illustrated in FIG. 2. It is known to obtain ferromagnetic thin films having such properties by means of particular fabrication techniques such as the evaporation of a Fe-Ni alloy (18% Fe—82% by weight) in vacuo and heating at a temperature of 350° C. at least. Films of this type are referred to as "reversed films."

It could be thought that the reversal of the magnetic vector in films of this type always takes place by coherent rotation since the curve I is located within the curve II at all points. Experiments have shown that this is not always the case with flat strips and that magnetization is again reversed with motion of the walls if the total applied field is oriented along or in immediate proximity to the easy axis. On the other hand, if the applied field vector makes an angle with the easy axis, the reversal mechanism is modified and the appearance of a new phenomenon is observed. In order to illustrate the behavior of the reversed film, there has been shown in FIG. 2 the variation in time of reversal of the magnetic vector $dM/dt$ in a film which is subjected to the resultant:

of a steady polarizing or bias field $H_p$ which is directed along the hard axis, of an alternating field which is directed along the easy axis and has sufficient amplitude to cause reversal of magnetization.

It is apparent that, when the polarizing field is zero, the reversal takes place in two steps. With a bias field $H'_k$ comprised between $H_k$ and $H_c$, there appears a first signal $dM/dt$. Then, in the case of the value $H_c$, there appears a signal having a higher intensity which indicates that reversal takes place essentially by displacement of the walls.

If the polarizing field assumes a value $H_{p1}$ which is substantially lower than $H_k$, the ratio between the amplitudes of the two signals is reversed.

In the case of a higher value $H_{p2}$ lower than $H_k$, a single signal then appears: the values of the field which causes the appearance of the signal are located on a curve III which is similar to the curve I but is external to this latter and intersects the easy axis at a point which corresponds to a value $H'_k$ of the field: this curve III will be designated as the critical curve of partial rotation.

In the case of fields $H_{p3}$, $H_{p4}$, etc., which are stronger than $K_k$, the signals become weaker, the reversal is slower and there is a departure from the zone in which maximum sensitivity and accuracy can be attained.

Reversal of magnetization in respect of an applied field with corresponds to curve III appears to take place by coherent rotation since it is devoid of Barkhausen noises and gives rise to a clean signal $dM/dt$ the amplitude of which can be measured with accuracy.

It should however be borne in mind that the quality of a thin film for magnetometry purposes is not in relation with $H_c/H_k$ but rather with $H_{ct}/H_k$, at least for those films which have such a thickness as to exhibit a square hysteresis loop along the hard axis. The minimum noise decreases when $H_{ct}/H_k$ (which should be higher than 1) increases. For such films, the magnetic vector reversal does not occur exactly as explained above, but the results are very similar.

The invention makes use of the foregoing properties by producing a reversal of the magnetic vector as a result of partial coherent rotation in a polarizing field zone in which the wall-motion phenomenon does not take place or only takes place to a slight extent.

The polarizing field which is directed along the hard axis can be generated in two ways:

1. It can be formed by a steady field produced by a coil which is different from that used for producing the pumping field and which has a perpendicular axis. The polarizing field also includes the component along the hard axis of the external field whose component along the easy axis is to be measured.

The value of the component of the field to be measured along the hard axis is negligible with respect to that of the external polarizing field (about 1 Oe) when the magnetometer is employed for measuring fields of low intensity, of 0.1 gamma to 1,000 gamma for example, and no correction is to be made then.

2. The bias field can be formed by the component along the hard axis of an alternating field whose component along the easy axis constitutes the pumping field; this alternating field is then produced by a single winding which makes an angle with the easy axis which is generally comprised between 30° and 60°.

This solution—which is used with flat films only—makes it necessary to place the pumping and detection windings coaxially in a direction which is inclined to the easy axis. In this case, the flat film is preferably formed with sides which are at an angle to the easy axis in order to reduce the overall size of the windings.

One example of application of the method which makes use of a steady polarizing field and of thin strips which constitute the films will now be described with reference to FIG. 3. In this example, there is measured the amplitude of the second harmonic of $dM/dt$ which—at least for weak fields—is proportional to the component of the external field $h$ along the easy axis.

The device comprises a double probe 10 made up of the thin films 12 and 12' and of associated windings. The easy axes of the two films are in parallel or aligned relation and it is the component $h$ along the easy axis of the external applied field which will be measured.

The thin film 12, for example, consists of a rectangular strip having two sides parallel to the easy axis. A pumping winding 14 which receives an electric current at a frequency $f$ from a frequency stabilized generator 16 and a detection winding 18 which is coaxial with the winding 14 are located around the strip. The film 12 is also associated with a polarizing winding 20 which is supplied from a direct current source 22 and which produces a steady field $H_p$ along the hard axis at right angles to the pumping field.

In the circuit which is shown in FIG. 3, the generator 16 supplies the winding 14 and 14' in parallel. Both windings are connected to the ends of a resistor 23 and the generator 16 is coupled to the resistor at an adjustable intermediate point for adjusting and balancing the currents in both windings. The windings 14 and 14' are evidently wound in opposite directions for the pumping fields to be out of phase by 180° in the films 12 and 12'. The polarizing windings 20 and 20' which have the same directions are supplied in series. The detection windings 18 and 18' are wound in the same directions, are mounted in series relation and feed a circuit. The letter comprises an amplifier 24 which is tuned for selectively amplifying the frequency which is double that of the generator 16, a synchronous detector 26 for measuring the amplitude and the sign of the voltage at this double frequency and an indicating instrument or recorder 28. It can be useful to place an electrostatic shield between the pumping and detection windings, the capacitive couplings of which can be different from one assembly 14-18, 14'-18' to the other; but in the majority of cases, a shield of this kind is not essential.

Care should be exercised for the amplifier 24 to receive harmonics generated in the twin probe 10 and not harmonics from the generator 16. For this purpose, a filter (not shown) cutting the frequency $2f$ may preferably be located between the generator 16 and the coils 14 and 14'. Another filter (not shown) cutting the signals at the fundamental frequency $f$ is also preferably located between the coils 18—18' and the amplifier 24 to eliminate the residual signals at the fundamental frequency which could saturate the amplifier.

The amplifier 24 should fulfill several requirements due to the very low amplitude of the useful signal when measuring low fields: its gain should be high and the electronic noise should be low.

For this purpose the amplifier may comprise a symmetrical low noise preamplifier, filters for elimination of the frequencies $f$ and $3f$, an impedance adapter, an attenuator and a selective amplifier having a high gain and tuned on the frequency $2f$.

A step by step attenuator providing for instance attenuations which are successive multiples of 10, makes it possible to provide the magnetometer with several sensitivity ranges, for instance 0–5 gamma, 0–50 gamma and 0–500 gamma.

The synchronous detector 26 may be constructed as illustrated on FIG. 3a. The reference signal at frequency $f$ from the generator is applied to an adjustable phase shifter 36. The output of the phase shifter is applied to a frequency doubler 38 and to a clamping circuit 40 which provides a square wave signal having a predetermined amplitude at frequency $2f$ whose amplitude is independent from the phase shift.

The detection is made by an amplifier and integrator 44. A signal to be measured is applied to the amplifier 42 which is alternately blocked and unblocked by the square wave from circuit 48. The output signal is sent to an integrator 44 having a narrow passband which feeds the indicator or recorder 28.

Figure 4:
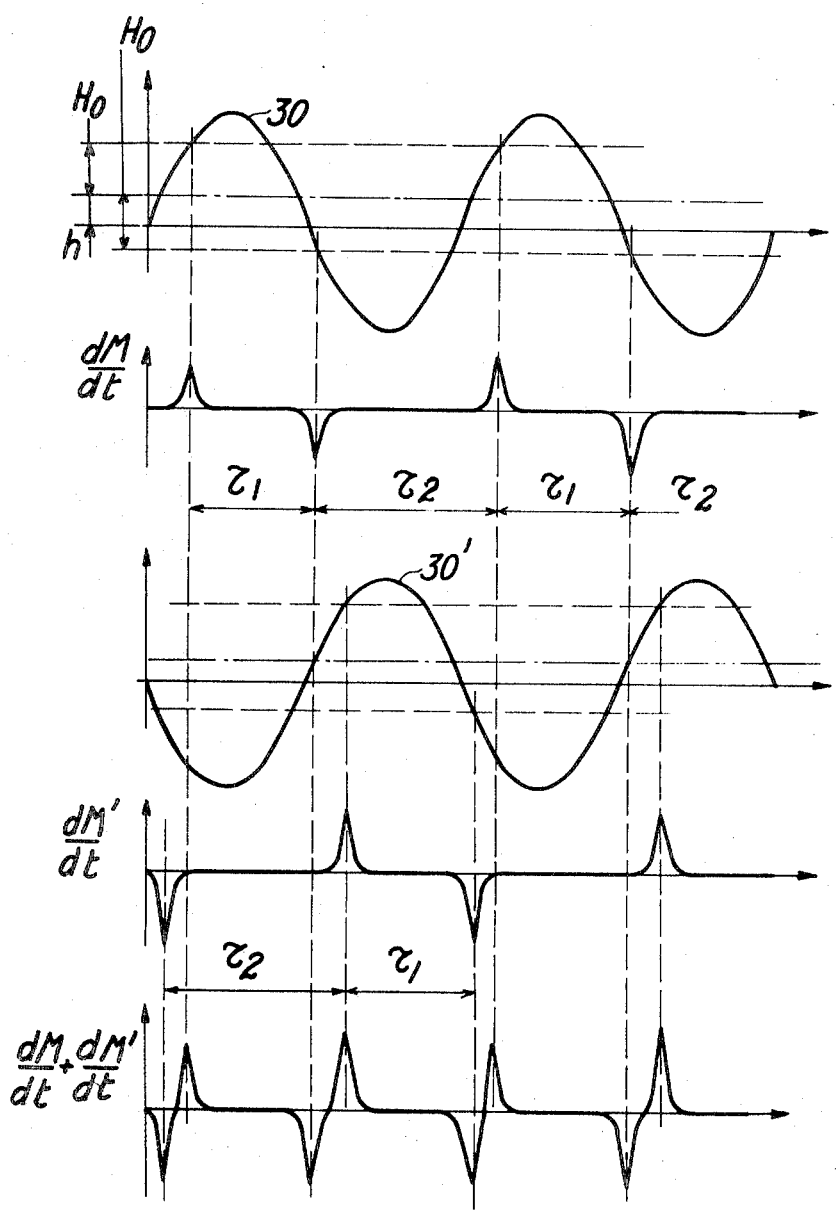
FIG. 4 shows diagrammatically the time variation of the pumping field and of the output signal which are produced by the device of FIG. 3.

The operation of the device is illustrated on FIG. 4 which shows the variation with time of the signals produced in the circuit of FIG. 3.

The curve 30 at the top portion of FIG. 4 and the curve 30' show the pumping field which is applied along the easy axis of the films 12 and 12' respectively; on these curves, $h$ designates the external field to be measured and $H_o$ the amplitude of the field for which the magnetization or magnetic vector reverses. In order that this reversal takes place by partial coherent rotation, the films are subjected to a polarizing field.

Under these conditions, the detection winding 14 which is associated with the film 12 receives a signal $dM/dt$ having the waveform shown in FIG. 4 and constituted by pulses which recur at time intervals $\tau_1$ and $\tau_2$: as has been seen earlier, it would be possible to deduce $h$ from a comparison between $\tau_1$ and $\tau_2$ and to employ only a single film. In practice, this solution is more difficult to carry into effect and results in lower sensitivity than that of FIG. 3.

Similarly, the detection winding 14' which is associated with the film 12' receives a signal $dM'/dt$ corresponding to a variation of the applied field indicated by the curve 30'. The sum of the signals $dM/dt$ and $dM'/dt$ delivered by the windings 14 and 14' which are placed in series appears on the lower curve of FIG. 4: since the field $h$ is different from 0, the reversals are not simultaneous and give rise to successive double-polarity pulses. On the contrary, if the field $h$ were zero, the juxtaposition of pulses would produce a zero resultant. It can be shown that, for low values of the field $h$ which is directed along the easy axis, there is a direct relation between the amplitude of the even harmonics and the intensity $h$.

Due to the association of the two films, the fundamental signal disappears entirely if the films and coils are identical with the result that there is a less critical need for filtering the frequency $f$ which is transmitted from the winding 14 to the winding 18.

The pumping frequency $f$ should be selected as a compromise between several requirements. Since the amplitudes of the harmonic are in direct relation with the pumping frequency, a high frequency is of advantage. However, the selection of too high a frequency would prevent from using a coil for generating the pumping field. As a consequence, a frequency of about 80 kc./s. will be used in most cases.

The frequency of the pumping field and the intensity of the biasing field should obviously be stable, particularly if the external field is close to the upper limit of the magnetometer range of operation. For instance for measuring the earth magnetic field with a precision of 0.1 gamma the frequency variation should be maintained within a limit of about $10^{16}$.

It should also be borne in mind that the amplitude of the signals is very small when the field to be measured is low. A rough calculation shows that for $f=80$ kc./s. $h=0.1$ gamma, a pumping field having an amplitude of 2 Oe and a threshold value of 1 Oe for reversal of the magnetization, the time interval $\Delta\tau$ is about $2.10^{13}$ ns. (and is impossible to measure accurately) while electrical signal is in the range of 1 $\mu$v. for a typical probe.

By way of example, it can be noted that the following characteristics have been adopted for a magnetometer: the two flat magnetic strips having a thickness of 250 A. exhibited the following properties:

$H_c$ (coercive field   : 2.6 Oe
$H_{ct}$ (coercive transverse field): 3.8 Oe
$H_k$ (anisotropy field)   : 2.3 Oe
$\alpha$ 90 (dispersion)   ; 1.8° each pumping winding and each detection winding had 500 turns of wire 0.2 mm. diameter. Each polarizing winding had 50 turns. The films and their pumping and detection windings took up a volume of 5×8×50 mm. and all the windings had a rectangular cross section.

A device of this type makes it possible to measure weak fields, lower than 1 gamma. The maximum value field which it is possible to measure depends on the manner in which the field is measured.

1. If the circuit arrangement which is illustrated in FIG. 3 is employed, the upper limit of measurable fields is smaller than $H_k/2$ which, in the case of $H_k=2.3$ Oe, results in a field of the order of 1 Oe.

2. In order to remove this limit, the magnetometer should be used as a zero detector: the signal delivered by the detector 26 controls a current which flows through additional compensation windings which produce a field which is parallel to the easy axis and which adjust it to a value such that the signal is zero. The compensating field is then equal to the external field along the easy axis to be measured which can be deduced from the current intensity in the compensation coils. The maximum field which can be measured is then limited by the stability of the compensating field. Of course the perpendicular component of the field should be such that the total bias field remains in the operating range. An additional advantage of this arrangement lies in the fact that variations in sensitivity which arise from changes of field along the hard axis are of very little importance since according to this embodiment a zero signal is obtained.

When use is made of the circuit arrangement which is illustrated in FIG. 3 and referred to above under (1), it is necessary to calibrate the magnetometer: calibration of sensitivity can be carried out by comparison with a highly sensitive absolute magnetometer such as a nuclear magnetic resonance magnetometer. The difficulty which arises from the fact that the latter measures the total field in which it is placed and not a component can be circumvented by adding in the direction of the easy axis of the probe additional fields which are measured simultaneously with both types of magnetometer. The zero remains to be determined and this can be achieved by placing the probes within a shielded chamber so as to limit a space in which the field is very low or even zero.

As has been mentioned earlier, a large number of embodiments are possible. In particular, instead of separate pumping and detection windings, it is possible to employ a single winding, the pumping current being fed through a filter which is tuned to the fundamental frequency $f$ and the detection current being transmitted through a filter which is tuned to the frequency $2f$. Instead of separate pumping and polarizing windings, it is also possible to employ a single winding which is inclined to the easy axis at an angle comprised between 30° and 60° and which produces an alternating field whose component along the easy axis constitutes the pumping field: this orientation of the winding is such that the applied magnetic field vector passes across the curve II into the zone in which reversal occurs by coherent partial rotation.

Instead of films constituted by flat strips, tubular films deposited on wires may be used. The circuit arrangement is illustrated in FIG. 5 in which the elements corresponding to those in FIG. 3 are provided with the same reference numeral increased by 100.

The device of FIG. 5 comprises two parallel or aligned wire portions each having a copper core 32 or 32′ covered with a glass film 34 or 34′ on which is deposited a thin and uniform film 112 or 112′ of nickel-iron alloy having a longitudinal easy axis. This deposit may be formed by cathode sputtering. If so required, a source 122 delivers into the wires a direct current which produces a tangential polarizing field.

There is again shown in FIG. 5 a pumping circuit constituted by a generator 116 and the windings 118 and 118′ and a detection circuit comprising the windings 114 and 114′ and the amplifier 124.

It is apparent that all embodiments of the device in accordance with the invention have advantages over arrangements of the prior art. The device is adapted to accurate measurement of low fields and especially fields having an intensity comprised between $10^5$ gamma and 0.1 gamma. This property as associated with the very small weight and overall size of the probe makes this magnetometer suitable for use in satellites. Furthermore, its directivity makes it possible by associating three heads to employ it for taking an accurate measurement of an angle of orientation with respect to the lines of force of an external magnetic field.

I claim:

1. A device for measuring the magnitude of the component along a direction of an external weak magnetic field, comprising a thin ferromagnetic film of the reversed type having an easy axis of magnetization along said direction and a hard axis and having a square hysteresis loop, means for subjecting said film to an alternating magnetic field at frequency $f$ parallel to the easy axis and of sufficient amplitude to reverse the magnetic vector in said thin film, a detection coil about said thin film and means for analyzing the electric signals collected by said detection coil.

2. Device according to claim 1, wherein said analyzing means are constructed and arranged to measure the amplitude of the harmonic at frequency $2f$ of the electrical signal collected by the detection coil and due to reversal of the magnetic vector in the film.

3. Device according to claim 2, having means for applying to the film a polarizing field directed along the hard axis.

4. Device according to claim 3, wherein the polarizing field which is directed along the hard axis of the film is a steady field and has an intensity of the same order of magnitude as the amplitude of the alternating field.

5. Device according to claim 3, wherein the polarizing field which is directed along the hard axis of the film is an alternating field and consists of the component along the hard axis of an alternating field whose component along the easy axis constitutes the alternating field.

6. Device according to claim 5, wherein said alternating field is generated by a coil having its axis located at an angle comprised between 30° and 60° with the easy axis.

7. Device according to claim 2, having two thin films mounted with their easy axes in parallel relation, a winding for the pumping field, the pumping and detection windings associated with one film being wound in the same direction and those associated with the other film in opposite direction, both detection windings being in series and supplying the analyzing means.

8. Device according to claim 7, wherein said films are flat strips.

9. Device according to claim 7, wherein said films are tubular and deposited on conducting wires.

10. Device according to claim 9, wherein said conducting wires carry a direct current which generates a tangential polarizing field.

11. In a device for measuring the magnitude of a weak external magnetic field, a sensor comprising: a thin ferromagnetic film having easy and hard axes of magnetization perpendicular to each other and having a square hysteresis loop; a first coil wound about said film along said easy axis; means for circulating in said coil an alternating current generating a field sufficient to reverse the magnetic vector in said film; means for subjecting said film to a steady field directed along said hard axes; and means including another coil wound about said film along said easy axis for detecting the magnitude along said easy axis of the external field.

12. In a device for measuring the magnitude of a weak external magnetic field, a sensor comprising: a thin ferromagnetic film having easy and hard axes of magnetization perpendicular to each other and having a square hysteresis loop; a first coil wound about said film along said easy axis; means for circulating in said coil an alternating current generating a field sufficient to reverse the magnetic vector in said film; means for subjecting said film to a steady field directed along said hard axis; and means including another coil wound about said film along said easy axis for detecting the magnitude along said easy axis of the external field, wherein the film consists of an annular layer on an electrically conductive wire and having easy and hard axes of magnetization directed longitudinally and circumferentially respectively and wherein a DC current is circulated in said wire to generate said steady field.

13. In a device for measuring the magnitude of a weak external magnetic field, a sensor comprising: a thin ferromagnetic film having easy and hard axes of magnetization perpendicular to each other and having a square hysteresis loop; a first coil wound about said film along said easy axis; means for circulating in said coil an alternating current generating a field sufficient to reverse the magnetic vector in said film; means for subjecting said film to a steady field directed along said hard axis; and means including another coil wound about said film along said easy axis for detecting the magnitude along said easy axis of the external field, having a coil wound about said film along said hard axis and means circulating a direct current in said second coil for generating said steady field.

* * * * *